United States Patent
Gohara et al.

(10) Patent No.: US 9,800,185 B2
(45) Date of Patent: Oct. 24, 2017

(54) MOTOR DRIVING CIRCUIT, COOLING DEVICE AND ELECTRONIC APPARATUS INCLUDING THE SAME

(71) Applicant: ROHM CO., LTD., Ukyo-ku, Kyoto (JP)

(72) Inventors: Yuki Gohara, Kyoto (JP); Tomofumi Mishima, Kyoto (JP)

(73) Assignee: ROHM CO., LTD., Ukyo-Ku, Kyoto (JP)

( * ) Notice: Subject to any disclaimer, the term of this patent is extended or adjusted under 35 U.S.C. 154(b) by 57 days.

(21) Appl. No.: 14/793,136

(22) Filed: Jul. 7, 2015

(65) Prior Publication Data

US 2016/0013742 A1 Jan. 14, 2016

(30) Foreign Application Priority Data

Jul. 9, 2014 (JP) ................................ 2014-141689

(51) Int. Cl.

| | |
|---|---|
| *H02P 7/29* | (2016.01) |
| *H02P 6/12* | (2006.01) |
| *H02H 7/085* | (2006.01) |
| *H02P 29/024* | (2016.01) |

(52) U.S. Cl.
CPC .............. *H02P 7/29* (2013.01); *H02H 7/085* (2013.01); *H02P 6/12* (2013.01); *H02P 29/0241* (2016.02); *H02H 7/0851* (2013.01)

(58) Field of Classification Search
CPC .......... H02P 7/29; H02P 7/085; H02P 7/0851; H02P 29/0241; H02P 6/12

USPC ......................................................... 318/461
See application file for complete search history.

(56) References Cited

U.S. PATENT DOCUMENTS

| | | | | |
|---|---|---|---|---|
| 5,091,951 A | * | 2/1992 | Ida .......................... | G06F 17/10 381/63 |
| 2005/0207585 A1 | * | 9/2005 | Christoph .......... | G10K 11/1788 381/71.11 |
| 2005/0235022 A1 | * | 10/2005 | Kogure .................. | H03H 17/04 708/300 |
| 2011/0234129 A1 | * | 9/2011 | Shimizu .................. | H02P 6/085 318/400.04 |

(Continued)

FOREIGN PATENT DOCUMENTS

| | | |
|---|---|---|
| JP | H10234130 A | 9/1998 |
| JP | 2005006405 A | 1/2005 |
| JP | 2008263733 A | 10/2008 |

*Primary Examiner* — Kawing Chan
(74) *Attorney, Agent, or Firm* — Cantor Colburn LLP

(57) ABSTRACT

A circuit for driving a fan motor includes: a control input interface circuit configured to generate a first digital value indicating an input duty ratio; a duty calculation unit configured to generate a duty command value linearly increasing with a slope with respect to the first digital value; a digital pulse width modulator configured to generate a control pulse having an output duty ratio corresponding to the duty command value; an output circuit configured to drive a fan motor based on the control pulse; a lock protection circuit configured to switch between an enable state and a disable state and to stop supply of power to the fan motor when lock of the fan motor is detected in the enable state; and a torque-off determination unit configured to switch the lock protection circuit to the disable state in a torque-off state.

18 Claims, 15 Drawing Sheets

(56) References Cited

U.S. PATENT DOCUMENTS

| | | | |
|---|---|---|---|
| 2011/0279072 A1* | 11/2011 | Shimizu | H02P 6/16 318/400.04 |
| 2011/0279975 A1* | 11/2011 | Shimizu | H02P 7/29 361/695 |
| 2012/0200244 A1* | 8/2012 | Otokawa | H02P 27/085 318/400.13 |
| 2012/0250385 A1* | 10/2012 | Takihara | H02M 1/32 363/132 |
| 2012/0326643 A1* | 12/2012 | Brannen | H02P 6/18 318/400.11 |
| 2014/0346993 A1* | 11/2014 | Mishima | H02P 7/04 318/400.38 |

* cited by examiner

MOTOR DRIVING CIRCUIT, COOLING DEVICE AND ELECTRONIC APPARATUS INCLUDING THE SAME

CROSS-REFERENCE TO RELATED APPLICATION

The present invention claims priority under 35 U.S.C. §119 to Japanese Application No. 2014-141689, filed on Jul. 9, 2014, the entire content of which is incorporated herein by reference.

TECHNICAL FIELD

The present disclosure relates to a motor driving circuit.

BACKGROUND

In recent years, as the speed of personal computers and workstations increases, the operation speed of computing LSI (Large Scale Integrated circuit) such as a CPU (Central Processing Unit), a DSP (Digital Signal Processor), and a GPU (Graphics Processing Unit) has steadily increased. Such an LSI generates more heat at a higher operation speed, i.e., a higher clock frequency. The heat from the LSI may lead the LSI itself to thermal runway or may have an impact on peripheral circuits. Therefore, it is very important to appropriately cool the LSI.

An exemplary technique for cooling the LSI is an air cooling method using a cooling fan. According to this method, for example, a cooling fan is installed to face the surface of the LSI and flow cold air onto the surface of the LSI.

If a motor for driving the cooling fan locks due to foreign substance caught in the fan, an excess current may flow into the coil or semiconductor element, impairing reliability of the device. To solve this problem, a lock protection circuit is used to stop the supply of power to the motor coil if the motor stops.

According to a technique, if a rotation sensor for detecting the rotation state of the motor detects that the motor has stopped rotating, an automatic resumption signal E is generated until the motor resumes rotating. The automatic resumption signal E is a signal which alternates ON for about 0.5 sec and OFF for about 3 sec. That is, if it is detected that the motor has stopped rotating, the motor is repeatedly driven for about 0.5 sec with an idle period of about 3 sec interposed therebetween.

According to the above technique, the lock protection function operates not only when the motor locks but also when the motor stops according to the instruction of a control input signal. Therefore, if the lock protection function operates and a signal for rotating the motor is input from the outside, the motor does not rotate until the automatic resumption signal E is turned on. That is, after the motor stops according to the instruction of the control input signal, a time lag occurs before the motor restarts rotating upon detection of a temperature rise of the object to be cooled. This time lag may result in difficulty in controlling the temperature.

Another technique restarts the rotation of a motor immediately after the motor stops according to the instruction of a control input signal. According to this technique, when the control input signal for the fan motor instructs the motor to stop for a predetermined period of time, the lock protection circuit is disabled (turned off). Accordingly, it is possible to expedite the time to re-drive the motor after the motor stops according to the instruction of the control input signal.

SUMMARY

The present disclosure provides some embodiments of a driving circuit which is capable of appropriately controlling the validation and invalidation of a lock protection function.

One aspect of the present disclosure provides a motor driving circuit for PWM (Pulse Width Modulation)-driving a fan motor, including: a control input interface circuit configured to generate a first digital value indicating an input duty ratio based on an external control input signal; a duty calculation unit configured to generate a duty command value linearly increasing with a slope, which can be set from the outside, with respect to the first digital value; a digital pulse width modulator configured to generate a control pulse having an output duty ratio corresponding to the duty command value; an output circuit configured to drive a fan motor based on the control pulse; a lock protection circuit configured to switch between an enable state and a disable state and to stop supply of power from the output circuit to the fan motor when lock of the fan motor is detected in the enable state; and a torque-off determination unit configured to determine one of a torque-on state indicating rotation of the fan motor and a torque-off state indicating stop of the fan motor based on the duty command value and to switch the lock protection circuit to the disable state in the torque-off state.

In the motor driving circuit, the slope of the output duty ratio to the input duty ratio can be set from the outside. As a result, the output duty ratio can have different values for the same input duty ratio. According to this aspect, the duty command value indicating the output duty ratio can be monitored instead of the control input signal indicating the input duty ratio, to detect the torque-off state indicating the intentional stop of the motor and appropriately invalidate the lock protection function.

The torque-off determination unit may (i) switch to the torque-off state if the duty command value is less than a first threshold in the torque-on state and may (ii) switch to the torque-on state if the duty command value is more than a second threshold in the torque-off state.

The second threshold may be larger than the first threshold. Accordingly, the lock protection circuit may have a hysteresis when switching between the enable state and the disable state, thereby preventing chattering and enhancing stability.

A hysteresis using the first threshold and the second threshold may be set in the duty command value in the duty calculation unit. Accordingly, the duty command value (output duty ratio) can be associated with switching between the torque-on state and the torque-off state, thereby achieving a stable operation.

The motor driving circuit may further include a slope setting terminal which receives information indicating a slope of the output duty ratio to the input duty ratio; and a slope acquisition unit configured to acquire a second digital value corresponding to the information indicating the slope. The duty calculation unit may linearly increase the duty command value with the slope corresponding to the second digital value with respect to the first digital value.

The control input interface circuit may include a PWM input terminal which receives an input pulse modulation signal having an input duty ratio, as the control input signal, from the outside; and a duty/digital converter which receives the input pulse modulation signal and converts the received input pulse modulation signal into the first digital value corresponding to the input duty ratio. According to this aspect, the duty/digital converter is installed so that the input pulse modulation signal can be directly input to the PWM input terminal.

The slope setting terminal may receive an analog DC voltage indicating the slope, and the slope acquisition unit may include a first A/D converter which converts the DC voltage at the slope setting terminal into the second digital value.

The slope setting terminal may receive serial or parallel digital data indicating the slope, and the slope acquisition unit may include an interface circuit which receives the digital data, and a memory which stores the second digital value corresponding to the digital data.

The slope setting terminal may receive digital data indicating the slope, and the slope acquisition unit may include a nonvolatile memory which stores the second digital value corresponding to the digital data.

The control input interface circuit may further include: a DC input terminal which is input with an analog DC voltage; and a second A/D converter which converts the DC voltage at the DC input terminal into a third digital value. The duty calculation unit may clamp the duty command value with the third digital value as a lower limit. This configuration can set the minimum rotational speed of the fan motor to any value. In addition, the motor driving circuit can be used in a platform for controlling the rotational speed with the analog input DC voltage.

Assuming that an output duty ratio is OUTDUTY, an input duty ratio is INDUTY, a slope is SLP, a lower limit of the duty command value is MIN, a parameter is OFS and a function to select a maximum value is max( ), the duty calculation unit may calculate the duty command value according to the following relationship:

OUTDUTY=SLP×max(INDUTY,MIN)+OFS.

Assuming that an output duty ratio is OUTDUTY, an input duty ratio is INDUTY, a slope is SLP, a lower limit of the duty command value is MIN, a parameter is OFS and a function to select a maximum value is max( ), the duty calculation unit may calculate the duty command value according to the following relationship:

OUTDUTY=max(SLP×INDUTY+OFS,MIN).

Using a constant K, the parameter OFS can be defined by one of the following equations.

OFS=100×(K−SLP)

OFS=100×K

OFS=100×(SLP−K)

The constant K may be set to 1 or may be set from the outside of the motor driving circuit.

The duty/digital converter may include: a level conversion circuit configured to multiply the input pulse modulation signal, which has been converted into two values of 1 and 0, by a coefficient $2^L$ (L being a natural number); and a digital low pass filter which filters output data of the level conversion circuit and output the first digital value.

The digital low pass filter may be a one-dimensional IIR (Infinite Impulse Response) filter and may include an adder, a delay circuit and a coefficient circuit connected in series. The adder may add output data of the delay circuit to the output data of the level conversion circuit and subtracts output data of the coefficient circuit. The delay circuit may delay output data of the adder, and the coefficient circuit may multiply the output data of the delay circuit by a coefficient $2^{-n}$ (n being a natural number).

The number n may be determined such that the output data of the coefficient circuit has a ripple with a width of 1 or less.

The motor driving circuit may further include a standby control unit which begins counting time after the lock protection circuit enters the disable state; stops at least a part of the motor driving circuit after a predetermined period of time lapses; and switches the motor driving circuit to a standby mode. In this case, even after the motor driving circuit switches to the torque-off state, the motor can be restarted in a short time (quick start) before the predetermined period of time lapses. In addition, if the torque-off state lasts for the predetermined period of time, the motor driving circuit can switch to the standby mode, thereby reducing power consumption.

The motor driving circuit is integrated on a single semiconductor substrate. As used herein, the term "integrated" is intended to include both of the case where all elements of a circuit are formed on a semiconductor substrate and the case where main elements of the circuit are integrated on the semiconductor substrate. In addition, some resistors, capacitors and the like may be provided outside the semiconductor substrate to adjust a circuit constant. Integrating the circuit on a single IC (Integrated Circuit) can reduce the circuit area and maintain characteristics of circuit elements uniformly.

Another embodiment of the present disclosure provides a cooling device including: a fan motor; and the above-described motor driving circuit configured to drive the fan motor.

According to another embodiment of the present disclosure provides an electronic apparatus including: a processor; and the above-described cooling device configured to cool the processor.

It is should be understood that any combinations of the elements described above, as well as the elements and expressions interchangeably used for describing methods, devices, systems and so on, are also construed as aspects of the present disclosure.

DETAILED DESCRIPTION

Figure 1:
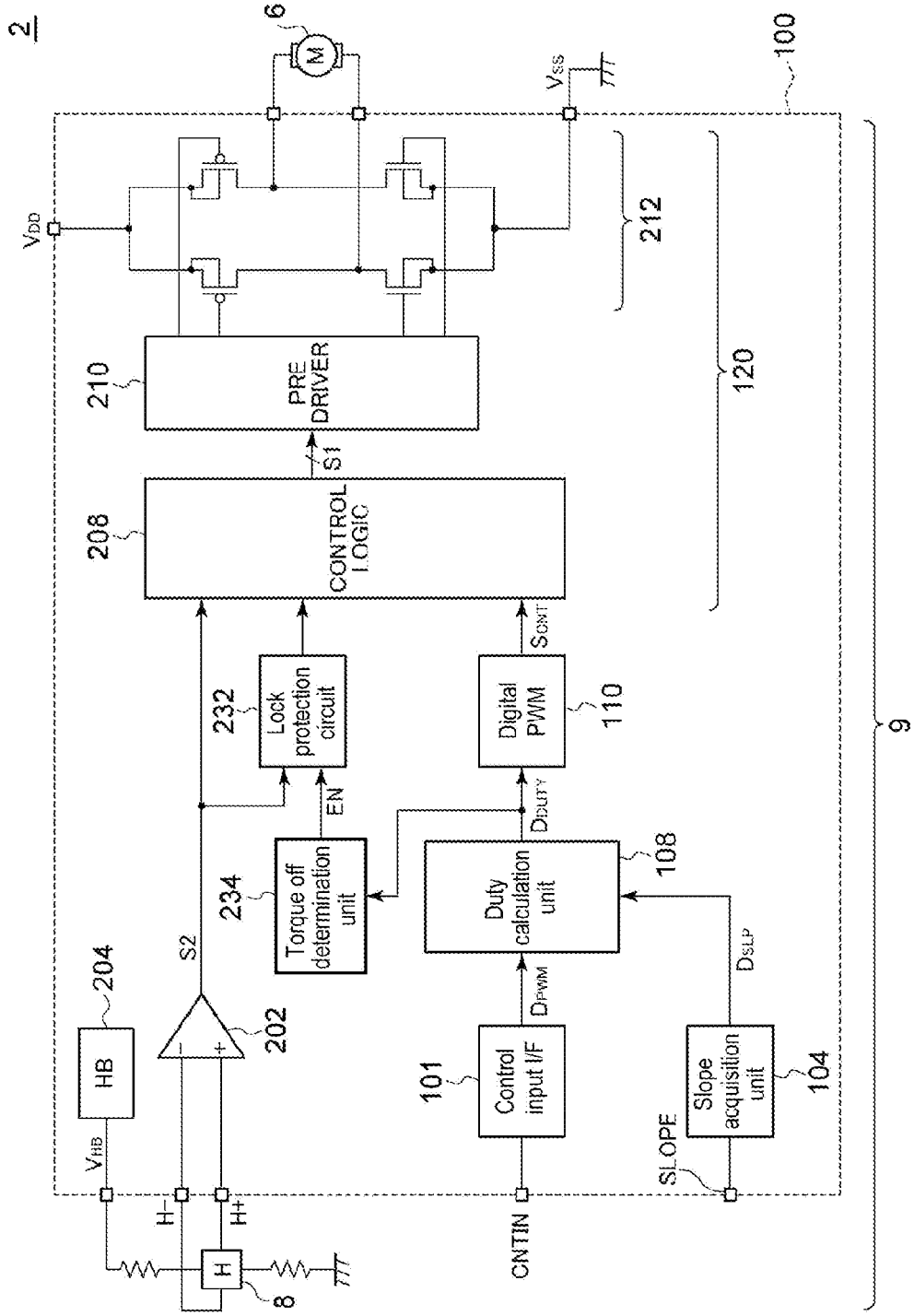
FIG. 1 is a circuit diagram showing the configuration of a cooling device with a driving IC according to an embodiment.

Hereinafter, various embodiments of the present disclosure will be described below in detail with reference to the accompanying drawings. Throughout the drawings, the same or similar elements, members, and processes are denoted by the same reference numerals and redundant descriptions thereof may be omitted. The disclosed embodiments are provided for the purpose of illustration, not limitation, of the present disclosure, and all features and combinations thereof described in the embodiments should not be necessarily construed as describing the gist of the present disclosure.

As used herein, the expression "a member A is connected with a member B" may mean that the member A is physically and directly connected with the member B, and that the member A is indirectly connected with the member B via another member which does not electrically affect the connection. Similarly, the expression "a member C is disposed between a member A and a member B" may indicate that the member A is directly connected to the member C or member B is directly connected to member C, and that the members are indirectly connected via another member which does not electrically affect the connection.

FIG. 1 is a circuit diagram showing the configuration of a cooling device 2 with a driving IC 100 according to an embodiment. The cooling device 2 is equipped in, for example, a desktop computer, a laptop computer, a workstation, a game machine, an audio system, a video system or the like and cools an object to be cooled (not shown) such as a CPU (Central Processing Unit), a GPU (Graphics Processing Unit), a power supply and so on. The cooling device 2 includes a fan motor 6 installed to face the object to be cooled and a driver 9 for driving the fan motor 6.

The fan motor 6 is a brushless DC motor. A driving IC 100 constitutes the driver 9, together with peripheral circuit parts, and PWM-drives the fan motor 6. A Hall sensor 8 is installed in the vicinity of the fan motor 6 in order to detect the position of the rotor. Components of the driver 9 are mounted on the same printed circuit board. FIG. 1 shows only some of peripheral parts needed to explain the basic configuration of the driving IC 100.

The driving IC 100 PWM (Pulse Width Modulation)-drives the fan motor 6 based on an external control input signal CNTIN.

The driving IC 100 includes a control input interface unit 101, a slope setting terminal (hereinafter referred to as a SLOPE terminal), a slope acquisition unit 104, a duty calculation unit 108, a digital pulse width modulator 110, an output circuit 120, a Hall comparator 202, a lock protection circuit 232 and a torque-off determination unit 234, and is integrated on a single semiconductor substrate.

The control input interface unit 101 generates a first digital value $D_{PWM}$ indicating an input duty ratio INDUTY based on the control input signal CNTIN. The format of the control input signal CNTIN and the circuit configuration of the control input interface unit 101 are not particularly limited.

The driving IC 100 is configured to allow a slope SLP of an output duty ratio OUTDUTY to the input duty ratio INDUTY to be set from the outside. The slope setting terminal (the SLOPE terminal) is input with information indicating the slope SLP. The slope acquisition unit 104 receives the information indicating the slope SLP and acquires a second digital value $D_{SLP}$ corresponding to the slope SLP.

The duty calculation unit 108 generates a duty command value $D_{DUTY}$ which linearly increases with the slope SLP corresponding to the second digital value $D_{SLP}$ with respect to the first digital value $D_{PWM}$. The duty command value $D_{DUTY}$ is data indicating a duty ratio OUTDUTY of a control pulse $S_{CNT}$. The digital pulse width modulator 110 generates the control pulse $S_{CNT}$ having the output duty ratio OUTDUTY corresponding to the duty command value $D_{DUTY}$.

The operation of the duty calculation unit 108 will now be described in more detail. For example, the duty calculation unit 108 may calculate the duty command value $D_{DUTY}$ (the output duty ratio OUTDUTY) according to the following equation (1)

$$\text{OUTDUTY} = \text{SLP} \times \text{INDUTY} + 100 \times (1-\text{SLP}) \text{ or } 0, \text{ whichever is larger.} \quad [\text{Equation (1)}]$$

The relationship of Equation (1) is determined with 100% as a reference such that OUTDUTY=100% when INDUTY=100%.

The driving IC 100 is input with Hall signals H− and H+ generated by the Hall sensor 8. The Hall comparator 202 compares the Hall signals H− and H+ and generates a pulse signal (square wave signal) S2 indicating the position of the rotor, which is in turn output to the output circuit 120.

The output circuit 120 alternately selects outputs OUT1 and OUT2 based on the output S2 of the Hall comparator 202 and switches the selected output based on the control pulse $S_{CNT}$.

The output circuit 120 includes a control logic circuit 208, a pre-driver 210 and an H bridge circuit 212. The control logic circuit 208 logically combines the pulse signal S2 from the Hall comparator 202 and the control pulse $S_{CNT}$ from the digital pulse width modulator 110 to generate a pulse signal S1 which indicates ON/OFF of each of four transistors in the H bridge circuit 212. The pre-driver 210 switches the H bridge circuit 212 based on the pulse signal S1.

The lock protection circuit 232 is configured to switch between an enable state and a disable state and detect whether or not the fan motor 6 is rotating in the enable state. Upon detecting that the fan motor 6 is locked to stop rotating, the lock protection circuit 232 stops the supply of power to the fan motor 6. The lock protection circuit 232 enters the enable state (valid) if an enable signal EN (which will be described later) has a high level and enters the disable state (invalid) if the enable signal EN has a low level.

In the enable state, the lock protection circuit 232 detects whether or not the fan motor 6 is locked, for example, by monitoring the pulse signal S2 output from the Hall comparator 202. Upon detecting that the fan motor 6 is locked, the lock protection circuit 232 switches a stop signal S3, which is output to the output circuit 120, from a low level to a high level. If the stop signal S3 is switched to the high level, the output circuit 120 turns off all of the transistors constituting the H bridge circuit 212. In some embodiments, the duration for which the transistors are turned off is several hundred milliseconds to several seconds. If the supply of power is stopped by the stop signal S3, no current is supplied to the fan motor 6.

Thus, an overcurrent is prevented from flowing into the fan motor 6 when the fan motor 6 is locked. In addition, a verification period $\tau_{LOCK}$ is set for the lock protection circuit 232 to detect that the fan motor 6 is stopped. The verification period $\tau_{LOCK}$ is, for example, 0.5 sec and is appropriately determined depending on the internal configuration of the lock protection circuit 232. On the other hand, in the disable state, the lock protection circuit 232 consistently outputs the stop signal S3 at the low level to the pre-driver 210.

The torque-off determination unit 234 determines one of the torque-on state indicating a rotation of the fan motor 6 and the torque-off state indicating stop of the fan motor 6, based on the duty command value $D_{DUTY}$, and switches the lock protection circuit 232 to the disable state in the torque-off state.

The basic configuration of the driving IC 100 has been described above. The driving IC 100 provides the SLP (slope setting) terminal and the slope acquisition terminal 104 so that the slope of the output duty ratio OUTDUTY to the input duty ratio INDUTY can be set from the outside. As a result, the output duty ratio OUTDUTY can have different values for the same input duty ratio INDUTY. Therefore, the torque-off determination unit 234 can detect the torque-off state indicating the intentional stop of the fan motor 6, by monitoring the duty command value $D_{DUTY}$ indicating the output duty ratio OUTDUTY, instead of the control input signal CNTIN ($D_{PWM}$) indicating the input duty ratio INDUTY, thereby appropriately invalidating the lock protection function.

Subsequently, input/output characteristics of the duty calculation unit 108 and determination processing of the torque-off determination unit 234 will be described with several examples.

First Example

Figure 2:
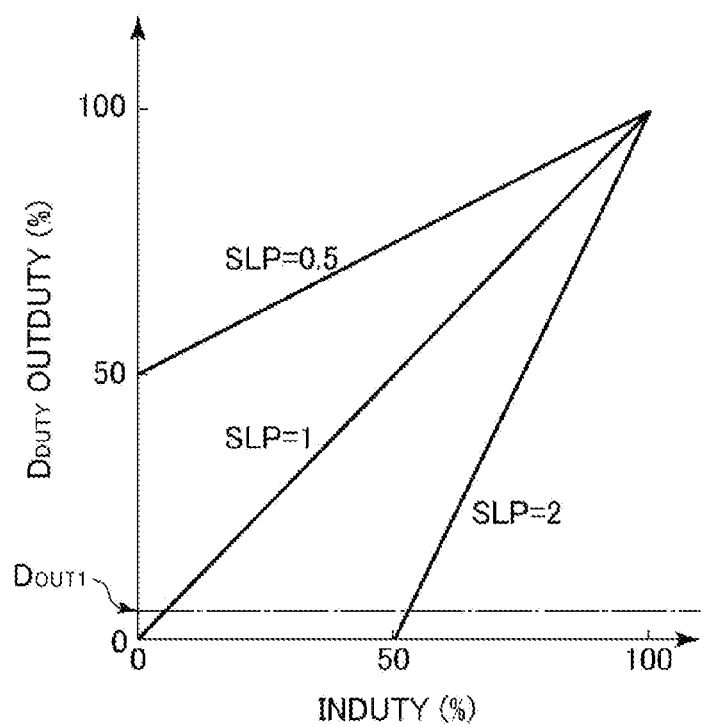
FIG. 2 is a view showing a relationship between an input duty ratio INDUTY and an output duty ratio OUTDUTY according to a first example.

FIG. 2 is a view showing a relationship between the input duty ratio INDUTY and the output duty ratio OUTDUTY according to a first example. FIG. 2 shows input/output characteristics of the duty calculation unit 108 when the slope SLP is set to 0.5, 1 and 2, respectively.

In this example, the torque-off determination unit 234 determines the torque-off state when the duty command value $D_{DUTY}$ indicating the output duty ratio OUTDUTY is 0%, and determines the torque-on state when the duty command value $D_{DUTY}$ is non-zero.

Second Example

Figure 3A:
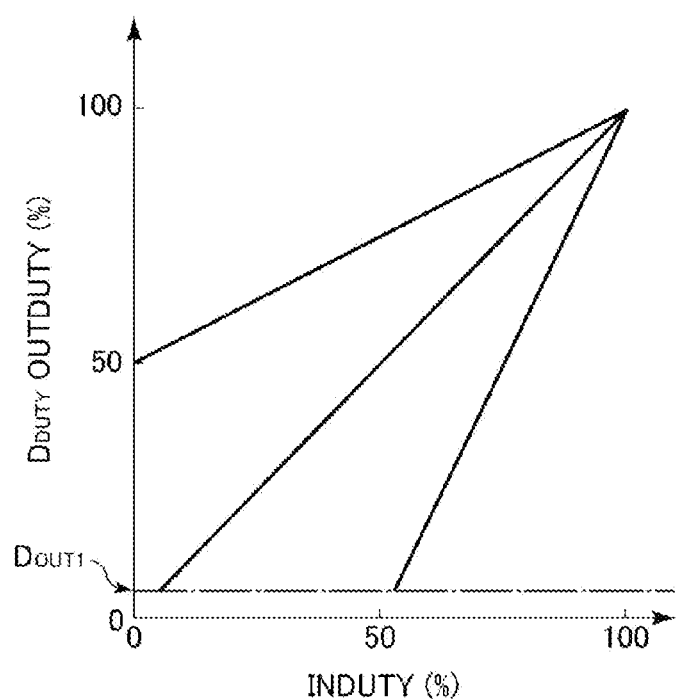
FIGS. 3A and 3B are views showing a relationship between an input duty ratio INDUTY and an output duty ratio OUTDUTY according to a second example.
Figure 3B:
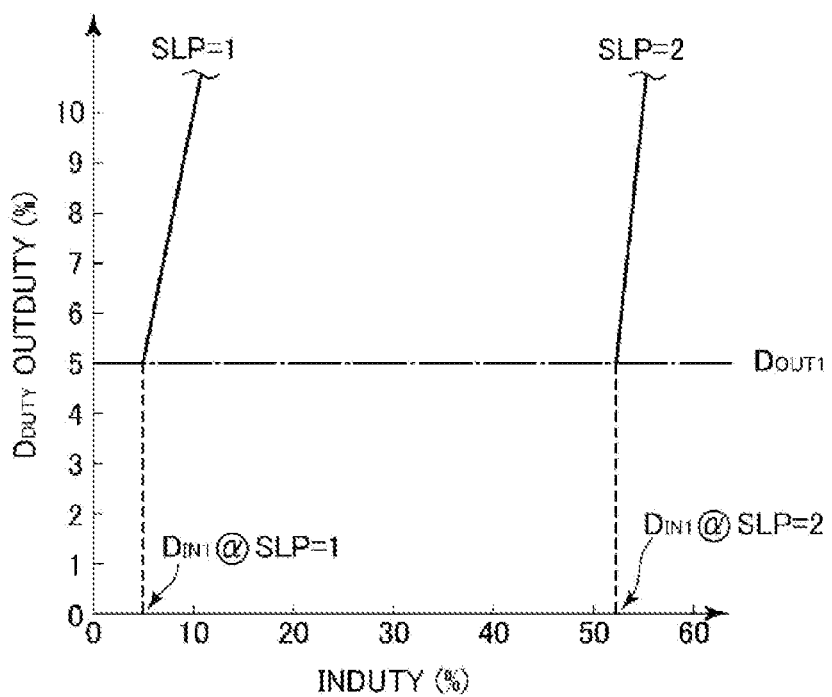

FIGS. 3A and 3B are views showing a relationship between the input duty ratio INDUTY and the output duty ratio OUTDUTY according to a second example. FIG. 3B is an enlarged view of FIG. 3A.

In the first example, if a noise or the like is mixed into the control input signal CNTIN in the torque-off state, the duty command value DDUTY (output duty ratio) becomes non-zero and the torque-off state is switched to the torque-on state. Therefore, in the second example, the duty calculation unit 108 generates the duty command value $D_{DUTY}$ based on the input/output characteristics shown in FIGS. 3A and 3B. Specifically, a predetermined first threshold $D_{OUT1}$ is set for the output duty ratio $D_{DUTY}$. Here, $D_{OUT1}$ is set to 5%. From Equation (1), a threshold $D_{IN1}$ for the input duty ratio INDUTY corresponding to the first threshold $D_{OUT1}$ is calculated. The threshold $D_{IN1}$ takes a different value for each slope SLP. For example, $D_{IN1}$=5% when SLP=1 and $D_{IN1}$=52.5% when SLP=2. Then, the duty calculation unit 108 sets OUTDUTY to 0 when INDUTY<$D_{IN1}$ and generates OUTDUTY based on Equation (1) when INDUTY>$D_{IN1}$.

The torque-off determination unit 234 compares the duty command value $D_{DUTY}$(OUTDUTY) with the first threshold $D_{OUT1}$. The torque-off determination unit 234 determines the torque-on state when OUTDUTY≥$D_{OUT1}$ and determines the torque-off state when OUTDUTY<$D_{OUT1}$.

The second example can provide higher stability of operation than the first example.

Third Example

Figure 4A:
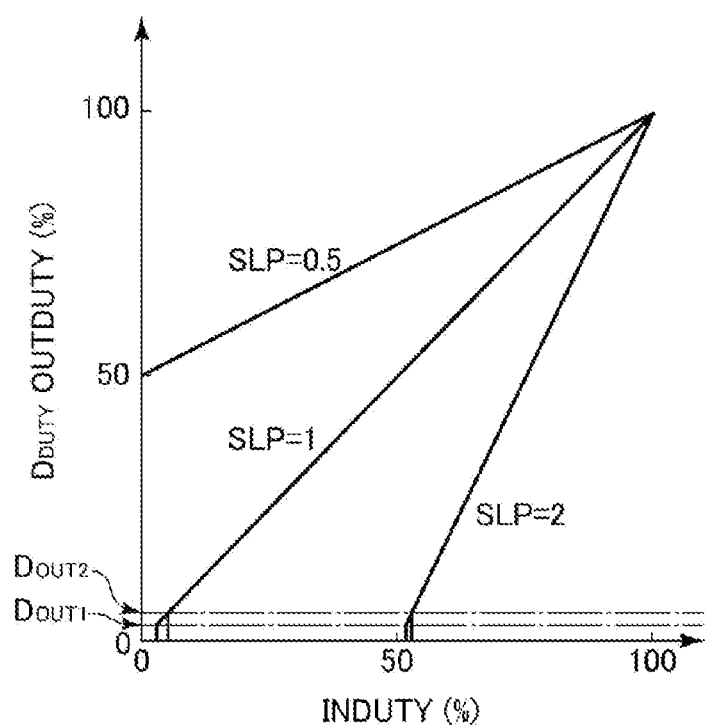
FIGS. 4A and 4B are views showing input/output characteristics of a duty calculation unit.
Figure 4B:
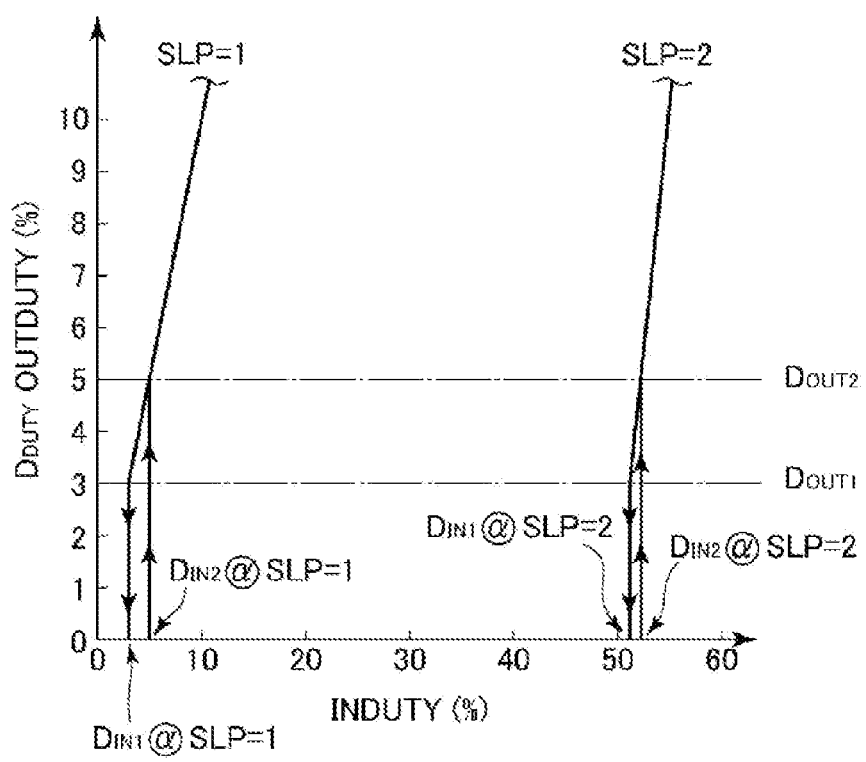

FIGS. 4A and 4B are views showing a relationship between the input duty ratio INDUTY and the output duty ratio OUTDUTY according to a third example. FIG. 4B is an enlarged view of FIG. 4A.

The third example sets a hysteresis to the second example. In the third example, the duty calculation unit 108 generates the duty command value $D_{DUTY}$ based on the input/output characteristics shown in FIGS. 4A and 4B. Specifically, a predetermined first threshold $D_{OUT1}$ and a predetermined second threshold $D_{OUT2}$ larger than the first threshold $D_{OUT1}$ are set for the output duty ratio $D_{DUTY}$. Here, $D_{OUT1}$ is set to 3% and $D_{OUT2}$ is set to 5%.

From Equation (1), the thresholds $D_{IN1}$ and $D_{IN2}$ for the input duty ratio INDUTY corresponding to the first threshold $D_{OUT1}$ and the second threshold $D_{OUT2}$, respectively, are calculated.

For SLP=1, $D_{IN1}$=3% and $D_{IN2}$=5%

For SLP=2, $D_{IN1}$=51.5% and $D_{IN2}$=52.5%

In the torque-on state, the torque-off determination unit 234 compares the duty command value $D_{DUTY}$(OUTDUTY) with the first threshold $D_{OUT1}$ and determines the torque-off state when OUTDUTY<$D_{OUT1}$. On the contrary, in the torque-off state, the torque-off determination unit 234 determines the torque-on state when OUTDUTY>$D_{OUT2}$.

The duty calculation unit 108 generates the output duty ratio OUTDUTY according to Equation (1) in the torque-on state and sets OUTDUTY to 0% in the torque-off state.

The third example can provide a higher stability of the operation than the second example by setting the hysteresis.

Hereinafter, the configuration of the driving IC 100 will be described in more detail.

Figure 5:
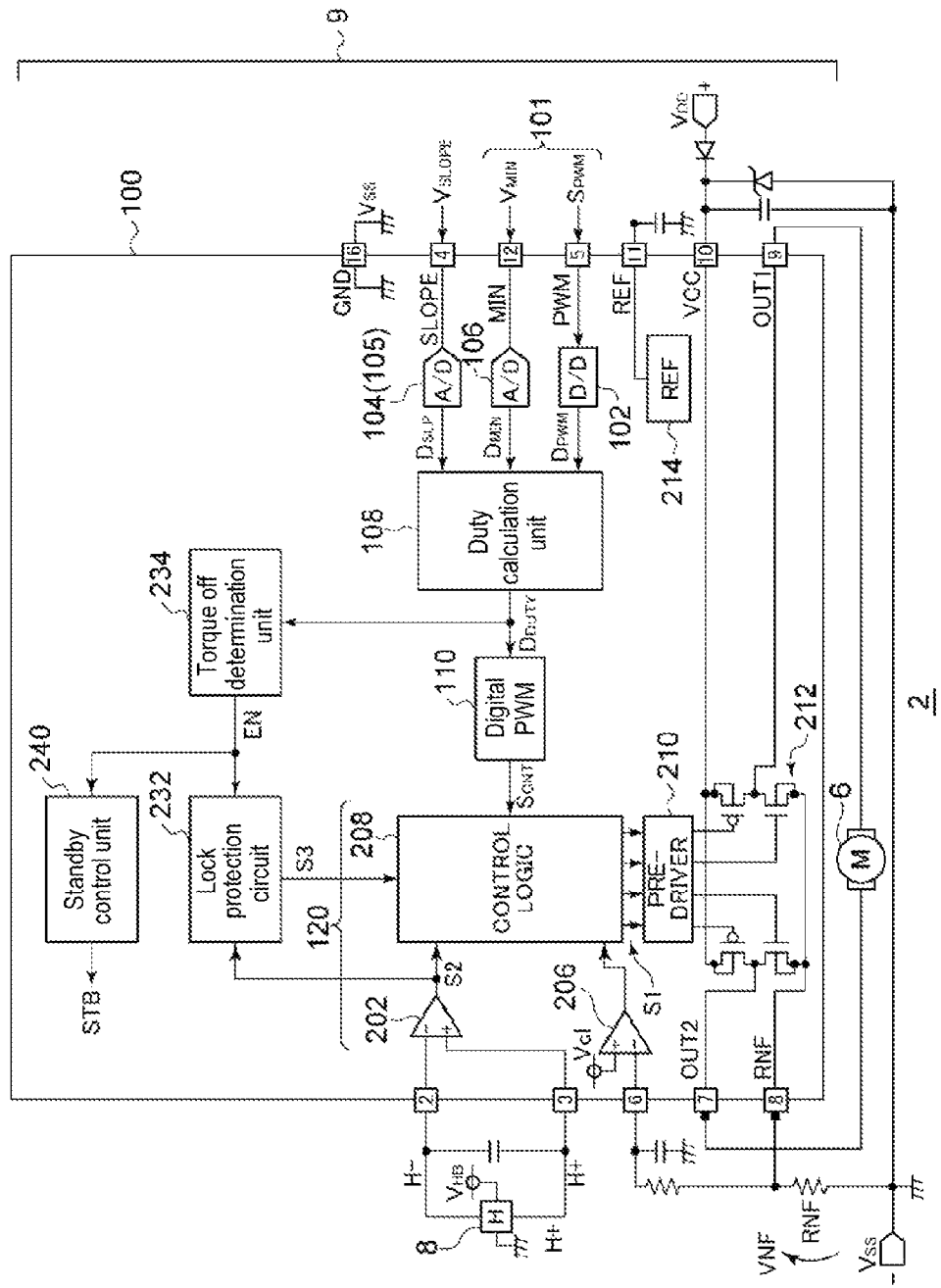
FIG. 5 is a circuit diagram showing a first embodiment of the driving IC.

FIG. 5 is a circuit diagram showing a first embodiment of the driving IC 100. The driving IC 100 includes a second A/D converter 106, a current clamp comparator 206, a reference voltage source 214 and a standby control unit 240.

A power supply voltage $V_{DD}$ is input to a power terminal (VCC terminal) with a pin No. 10 and a ground voltage $V_{SS}$ is input to a ground terminal (GND terminal) with a pin No. 16. The reference voltage source 214 generates a reference voltage $V_{REF}$ stabilized to a predetermined level and outputs it to a reference voltage terminal (REF terminal) with a pin No. 11. The reference voltage $V_{REF}$ is used inside and outside of the driving IC 100. In the present disclosure, pin numbers are only for convenience and are independent of a pin layout.

The outputs of the H bridge circuit 212 are connected to the fan motor 6 via a pin No. 7 (OUT2) and a pin No. 9 (OUT1). A terminal below the H bridge circuit 212 is connected to a pin No. 8 (RNF).

The Hall signals H− and H+ generated by the Hall sensor 8 are respectively input to a pin No. 2 and a pin No. 3 of the driving IC 100.

A current detection resistor RNF is interposed between the H bridge circuit 212 and a ground line input with the ground voltage $V_{SS}$, in other words, between a pin No. 8 and the ground line. A detection voltage VNF, which is proportional to a current flowing through the fan motor 6, is generated in the resistor RNF. The detection voltage VNF is input to the pin No. 6 via an RC filter. The current clamp comparator 206 compares the detection voltage VNF with a predetermined voltage Vc1 which defines the upper limit of the current flowing through the fan motor 6. When an output of the current clamp comparator 206 is asserted (high level), the control logic circuit 208 changes a logic value of the pulse signal S1 to stop the supply of power to the fan motor 6.

In this embodiment, an analog DC voltage $V_{SLOPE}$ having a voltage level corresponding to the slope SLP is input to the SLOPE terminal. Therefore, the slope acquisition unit 104 includes a first A/D converter 105 for converting the analog DC voltage $V_{SLOPE}$ into a digital value $D_{SLP}$.

The standby control unit 240 begins counting time after the lock protection circuit 232 enters the disable state (in other words, the torque-off determination unit 234 detects the torque-off state); stops at least a part of the driving IC 100 after a predetermined period of time lapses; and switches the driving IC 100 to a standby mode. Thus, even in the torque-off state, it is possible to restart the motor in a short time before the predetermined period of time lapses. In addition, if the torque-off state lasts for a predetermined period of time, the driving IC 100 can switch to the standby mode, thereby reducing the power consumption.

The configuration of the output circuit 120 is not limited to that shown in FIG. 5 but may be modified in different ways. In addition, the externally-attached Hall sensor 8 shown in FIG. 5 may be incorporated in the driving IC 100.

Subsequently, the generation of the control pulse $S_{CNT}$ will be described in more detail.

An input pulse modulation signal $S_{PWM}$ (control input signal CNTIN) having the input duty ratio INDUTY is input from the outside to a PWM input terminal (simply referred to as a PWM terminal) with the pin No. 5. A duty/digital converter 102 receives the input pulse modulation signal $S_{PWM}$ and converts it into the first digital value $D_{PWM}$ corresponding to the input duty ratio INDUTY. The PWM input terminal and the duty/digital converter 102 correspond to the control input interface unit 101 shown in FIG. 1.

The driving IC 100 is configured such that the slope SLP of the output duty ratio OUTDUTY to the input duty ratio INDUTY can be set from the outside. Information indicating the slope SLP is input to the slope setting terminal (SLOPE terminal) with the pin No. 4. The slope acquisition unit 104 receives the information indicating the slope SLP and acquires the second digital value $D_{SLP}$ corresponding to the slope SLP.

In this embodiment, the analog DC voltage $V_{SLOPE}$ having a voltage level corresponding to the slope SLP is input to the SLOPE terminal. Therefore, the slope acquisition unit 104 includes the first A/D converter 105 for converting the analog DC voltage $V_{SLOPE}$ into a digital value.

For example, the first A/D converter 105 is configured such that SLP=2 when $V_{SLOPE}=V_{REF}$, SLP=1 when $V_{SLOPE}=V_{REF}/2$ and SLP=½ when $V_{SLOPE}=V_{REF}/4$.

The duty calculation unit 108 generates the duty command value $D_{DUTY}$ which linearly increases with the slope SLP corresponding to the second digital value $D_{SLP}$ with respect to the first digital value $D_{PWM}$. The duty command value $D_{DUTY}$ is data indicating the duty ratio OUTDUTY of the control pulse $S_{CNT}$. The digital pulse width modulator 110 generates the control pulse $S_{CNT}$ having the output duty ratio OUTDUTY corresponding to the duty command value $D_{DUTY}$.

The operation of the duty calculation unit 108 will now be described in more detail. As described above, the duty calculation unit 108 may calculate the duty command value $D_{DUTY}$ (the output duty ratio OUTDUTY) according to Equation (1).

In addition, the driving IC 100 may set the minimum speed of the fan motor 6 from the outside. An analog DC voltage $V_{MIN}$ is input to a DC input terminal (MIN terminal) with a pin No. 12. The second A/D converter 106 converts the second DC voltage $V_{MIN}$ into a third digital value $D_{MIN}$. The duty calculation unit 108 clamps the duty command value $D_{DUTY}$ with the third digital value $D_{MIN}$ as a lower limit.

In this case, Equation (1) may be modified into the following equation (2). MIN denotes the minimum duty ratio represented by the third digital value $D_{MIN}$.

$$\text{OUTDUTY}=\text{SLP}\times\max(\text{INDUTY},\text{MIN})+100\times(1-\text{SLP}) \quad [\text{Equation (2)}]$$

where, max represents a function to select a larger one of INDUTY and MIN. The detailed configuration of the duty calculation unit 108 is not particularly limited but it would be understood to those skilled in the art that the duty calculation unit 108 may be configured by a combination of a product-sum operator, a multiplier, an adder and so on.

Since the output duty ratio OUTDUTY can also be controlled by the voltage $V_{MIN}$ at the MIN terminal, the MIN terminal and the second A/D converter 106 can also correspond to the control input interface unit 101 shown in FIG. 1.

The input/output characteristics of the duty calculation unit 108 may be determined with 0% as a reference such that OUTDUTY=0% when INDUTY=0% or may be determined with 50% as a reference such that OUTDUTY=50% when INDUTY=50%.

Figure 6:
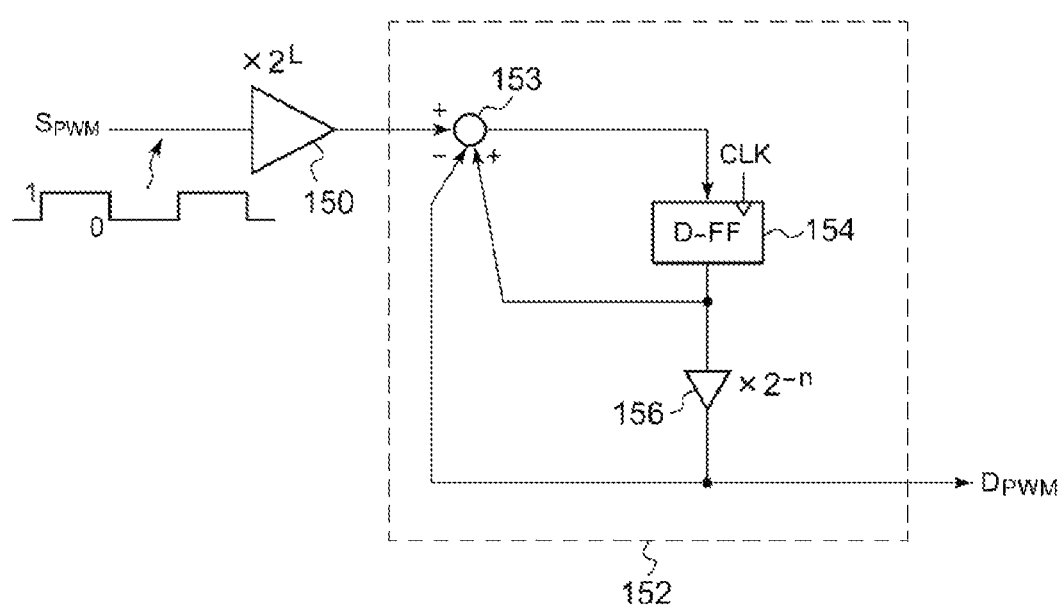
FIG. 6 is a circuit diagram showing the configuration of a duty/digital converter.

FIG. 6 is a circuit diagram showing the configuration of the duty/digital converter 102. The duty/digital converter 102 includes a level conversion circuit 150 and a digital filer 152.

A high level of the input PWM signal $S_{PWM}$ is converted into 1 and a low level thereof is converted into 0. This can be achieved by inputting the input PWM signal $S_{PWM}$ to a CMOS (Complementary Metal Oxide Semiconductor). The level conversion circuit 150 multiplies the input PWM signal, which has been converted into a 1/0 signal, by a coefficient $2^L$. If L=7, 1 and 0 of the input PWM signal $S_{PWM}$ are respectively converted into 128 and 0, which are in turn input to the digital filter 152 at the subsequent stage.

The digital filter 152 is a one-dimensional IIR (Infinite Impulse Response) low pass filter and includes an adder 153, a delay circuit 154 and a coefficient circuit 156, which are connected in series.

The delay circuit 154 has a bit width (L+n) and delays output data of the adder 153 by a delay time $T_{CLK}$ in synchronization with a clock signal CLK having a period $T_{CLK}$.

The adder 153 multiplies output data of the delay circuit 154 by a coefficient $2^{-n}$. The constant n determines a frequency characteristic of the low pass filter. The adder 153 and the coefficient circuit 156 may include a bit shifter which shifts input data by n bits to the right.

The adder 153 adds the output data of the level conversion circuit 150 to the output data of the delay circuit 154 and subtracts the output data of the coefficient circuit 156. A result of the operation is output to the delay circuit 154.

Figure 7A:
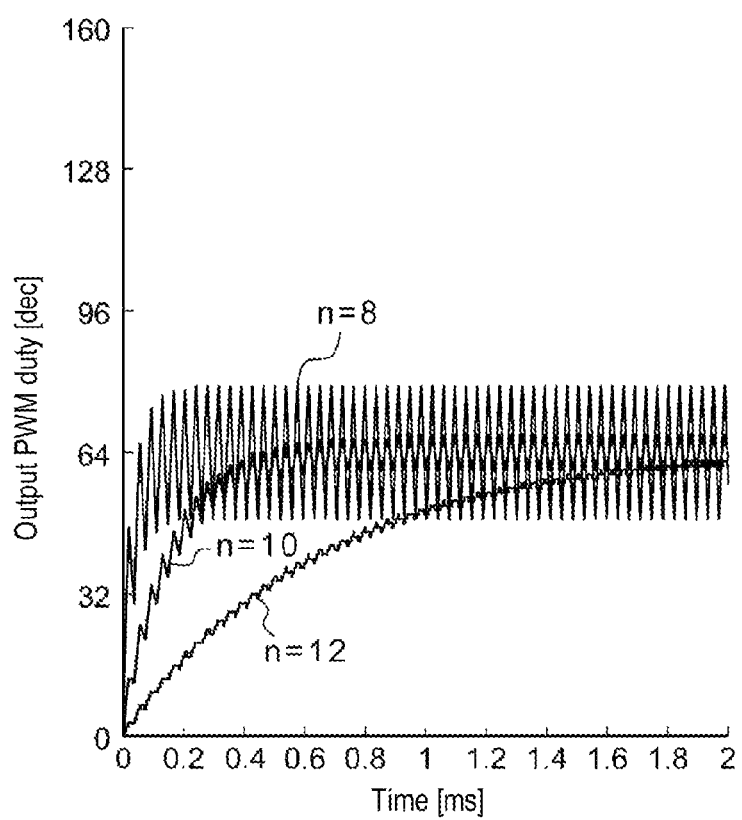
FIGS. 7A and 7B are views showing the operation of a PWM duty/digital converter shown in FIG. 5.
Figure 7B:
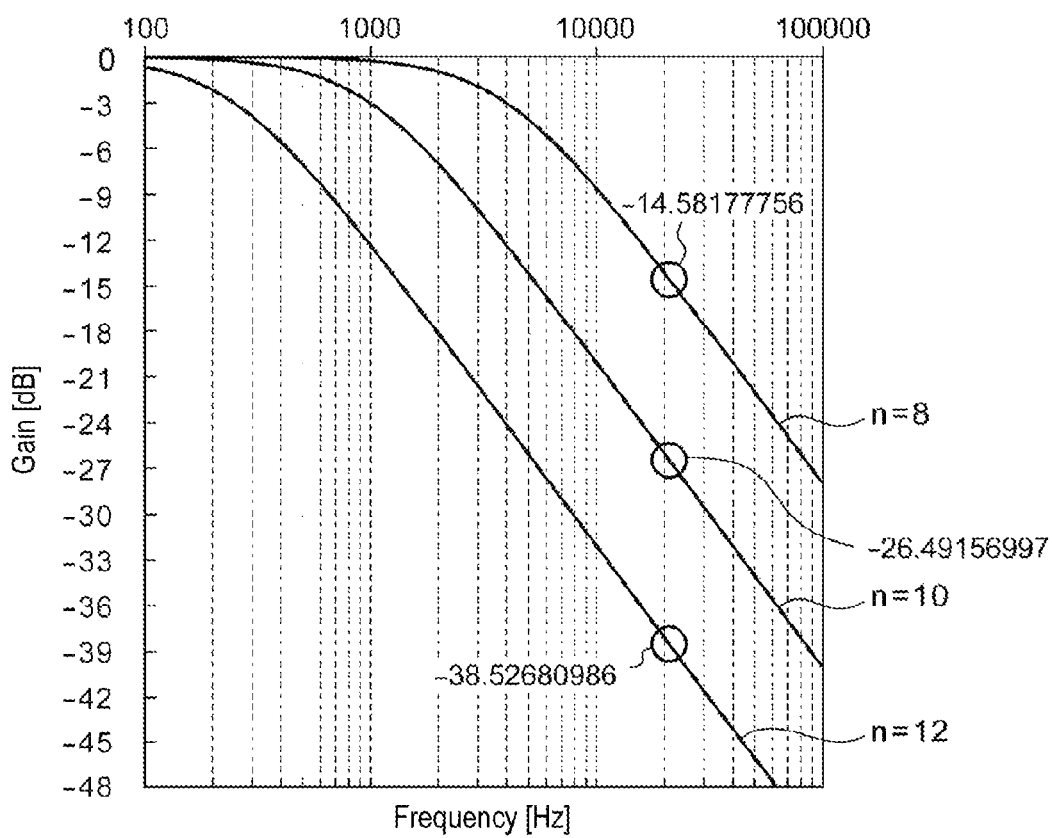

FIGS. 7A and 7B are views showing the operation of the PWM duty/digital converter shown in FIG. 5. FIG. 7A shows the first digital value $D_{PWM}$ when the duty ratio of the input PWM signal is 50%. The gain (responsiveness) and the ripple of the feedback loop change depending on the value n.

A frequency $f_{CLK}$ of the clock signal CLK is considered. When the input PWM signal $S_{PWM}$ is converted into a duty ratio with L bits, it is preferable to convert with accuracy of $\frac{1}{2^L}$ or less. For example, if it is converted into a duty ratio with L=7 bits (0 to 127), the accuracy may preferably be $\frac{1}{128}$ ($\cong 1\%$) or less. If the input PWM signal $S_{PWM}$ has a carrier frequency $f_{PWM}$ of 28 kHz, the clock signal CLK must have the frequency $f_{CLK}$ of at least 3.6 MHz, which is $2^L$ (=128) times as large as the carrier frequency $f_{PWM}$, in order to generate the first digital value $D_{PWM}$ for each cycle of the input PWM signal, without losing data. This can prevent the generation of bits.

Subsequently, a filtering coefficient n is considered. FIG. 7B is a view showing a low pass filter characteristic of the duty/digital converter 102. In order to confine the ripple of the first digital value $D_{PWM}$ within one step, the gain G is set to about $\frac{1}{128}$ (=−42 dB), as a guideline. If n=12, a removal rate of about −38.5 dB can be obtained when the carrier frequency $f_{PWM}$ of the input PWM signal $S_{PWM}$ is 21 kHz. A removal rate lower than −42 dB can be obtained with a higher carrier frequency $f_{PWM}$.

Figure 8A:
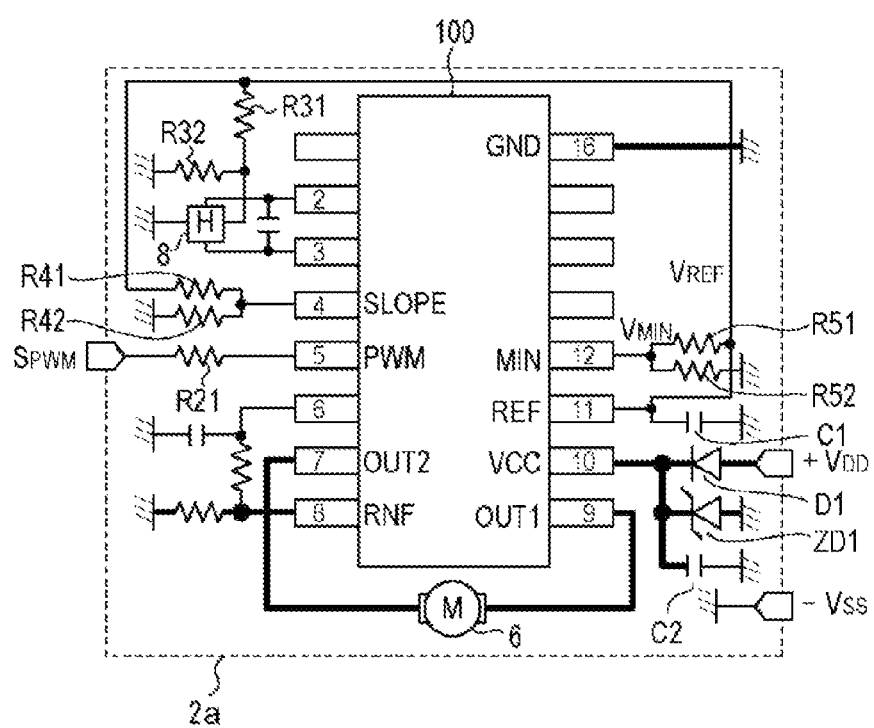
FIGS. 8A and 8B are circuit diagrams of cooling devices in different platforms, respectively.
Figure 8B:
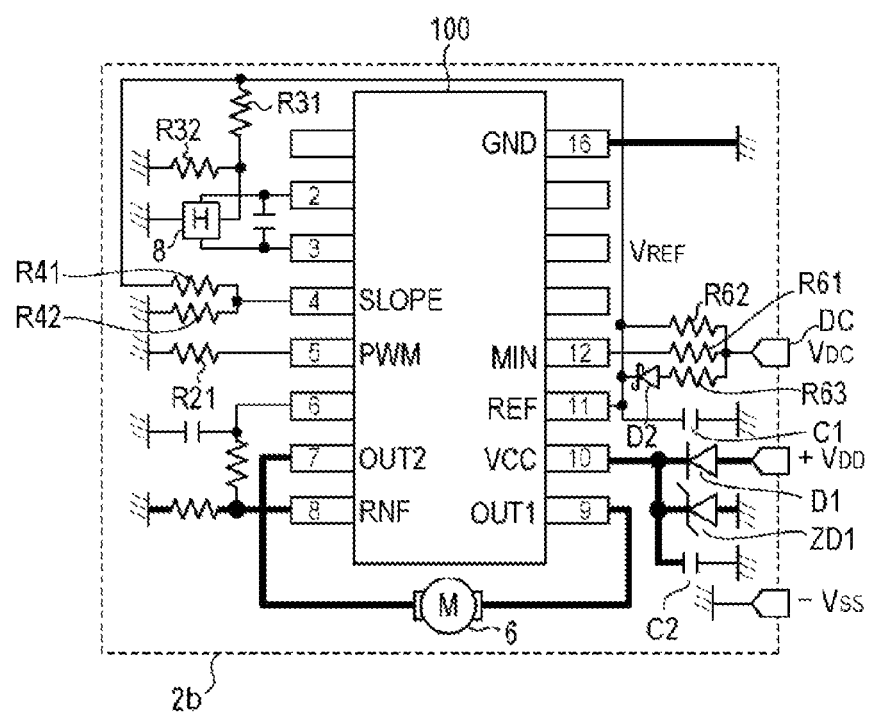

The configuration of the driving IC 100 has been described in the above. Subsequently, the operation thereof will be described. The driving IC 100 can be employed for various platforms having different control systems. FIGS. 8A and 8B are circuit diagrams of cooling devices 2a and 2b in different platforms, respectively. FIG. 8A is different from FIG. 8B in terms of peripheral circuits.

The platform of FIG. 8A will first be described. In the cooling device 2a according to the first platform, the input PWM signal $S_{PWM}$ is input from an processor external to the driving IC 100, for example, a CPU or a microcomputer, to the PWM terminal (pin No. 5) via a resistor R21.

A power supply voltage $V_{DD}$ is input to the VCC terminal via a reverse-current prevention diode D1. An overcurrent protection zener diode ZD1 and a smoothing capacitor C2 may be connected to the VCC terminal.

A smoothing capacitor C11 is connected to the REF terminal (pin No. 11). The reference voltage $V_{REF}$ by the internal reference voltage source 214 is output from the REF terminal. Resistors R31 and R32 divide the reference voltage $V_{REF}$ of the REF terminal to generate a Hall bias voltage $V_{HB}$ of the Hall sensor 8.

Resistors R41 and R42 divide the reference voltage $V_{REF}$ and input the divided voltage to the SLOPE terminal (pin No. 4). Resistors R51 and R52 divide the reference voltage $V_{REF}$ and input the divided voltage to the MIN terminal (pin No. 12).

The configuration of the cooling device 2a has been described in the above. With this cooling device 2a, the slope of the input/output characteristics of FIG. 4 can be freely set according to a voltage division ratio of the resistors R41 and R42. In addition, the minimum speed of the fan motor 6 can be freely set according to a voltage division ratio of the resistors R51 and R52.

The cooling device 2a has the following advantages. As a first advantage, the cooling device 2a of FIG. 8A can significantly reduce the number of circuit parts since it only needs the resistor R21 as an interface.

As a second advantage, in the platform of FIG. 8A, the duty ratio INDUTY of the input PWM signal is directly converted into a digital value by the duty/digital converter 102 and the control input signal SCNT, which is PWM-modulated in a digital domain, is generated. Therefore, there is no need to increase the power supply voltage $V_{DD}$, and the power consumption can be reduced.

In addition, in the driving IC 100 according to this embodiment, the rotational speed of the motor can be controlled according to the analog DC voltage. In the platform of FIG. 8B, an analog input DC voltage $V_{DC}$ indicating the rotational speed of the fan motor 6 is input from the outside to the DC terminal.

The input DC voltage $V_{DC}$ is input to the MIN terminal via a resistor R61. A resistor R62 is interposed between the REF terminal and the DC terminal. In addition, in order to clamp a voltage of the MIN terminal, a diode D2 and a resistor R63 are connected in series between the REF terminal and the DC terminal. In this platform, the PWM terminal is grounded via the resistor R21.

The configuration of the cooling device 2a of FIG. 8B has been described in the above. In the cooling device 2b, since the PWM terminal is grounded, the output $D_{PWM}$ of the duty/digital converter 102 becomes zero. The output $D_{MIN}$ of the second A/D converter 106 has a digital value into which the input DC voltage $V_{DC}$ is converted. Therefore, with $D_{MIN} > D_{PWM}$ and with MIN>INDUTY in Equation (2), the following equation (3) is obtained.

$$\text{OUTDUTY} = \text{SLP} \times \text{MIN} + 100 \times (1 - \text{SLP}) \qquad \text{[Equation (3)]}$$

That is, in the cooling device 2b of FIG. 8B, the rotation speed of the fan motor 6 can be controlled according to the input DC voltage $V_{DC}$.

Thus, the driving IC 100 according to this embodiment can be employed for both of the platform performing the rotation control based on the PWM signal and the platform performing the rotation control based on the DC voltage. That is, a user of the driving IC 100 can freely select multiple platforms.

APPLICABILITY

Figure 9:
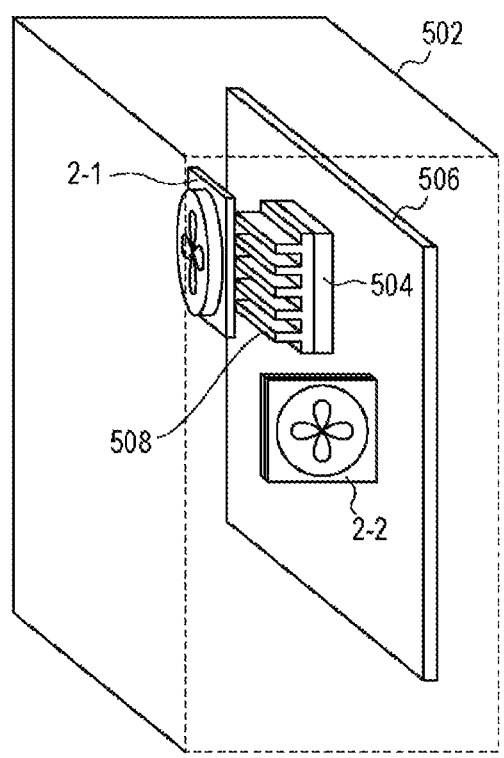
FIG. 9 is a perspective view of a computer with a cooling device.

Finally, applications of the cooling device 2 will be described. FIG. 9 is a perspective view of a computer with the cooling device 2. A computer 500 includes a housing 502, a CPU 504, a mother board 506, a heat sink 508 and a plurality of cooling devices 2.

The CPU 504 is mounted on the mother board 506. The heat sink 508 is in close contact with the upper surface of the CPU 504. The cooling device 2_1 is installed to face the heat sink 508 and flows air to the heat sink 508. The cooling device 2_2 is installed on the back side of the housing 502 and feeds external air into the housing 502.

The cooling devices 2 may be mounted on various electronic apparatuses such as a workstation, a notebook computer, a television, a refrigerator and the kike, in addition to the computer 500.

The present disclosure has been described above by way of embodiments. The disclosed embodiments are illustrative only. It should be understood by those skilled in the art that various modifications to combinations of elements or processes may be made and such modifications fall within the scope of the present disclosure. Such modifications will be described below.

First Modification

While how to set the minimum rotational speed of the fan motor 6 has been described using Equation (2) in the above embodiment, the present disclosure is not limited thereto but may use the following more generalized equation (2a).

$$\text{OUTDUTY} = \text{SLP} \times \max(\text{INDUTY}, \text{MIN}) + \text{OFS} \qquad \text{[Equation (2a)]}$$

where, OFS represents a parameter. Using a constant K, OFS can be defined by one of the following equations (4a) to (4c).

$$OFS=100\times(K-SLP) \quad \text{[Equation (4a)]}$$

$$OFS=100\times K \quad \text{[Equation (4b)]}$$

$$OFS=100\times(SLP-K) \quad \text{[Equation (4c)]}$$

The constant K may be set from the outside of the driving IC 100 by using an input to a serial interface, a parallel interface or a set pin. Alternatively, the constant K may be a fixed value. Equation (2) adopts Equation (4a) and corresponds to the case where K is 1.

Second Modification

While how to set the minimum rotational speed of the fan motor 6 has been described using Equation (2) in the above embodiment, the present disclosure is not limited thereto but may use the following equation (5).

$$OUTDUTY=\max(SLP\times INDUTY+OFS,MIN) \quad \text{[Equation (5)]}$$

OFS is defined by one of the above equations (4a) to (4c).

Equation (2) may be understood to clamp the input duty ratio INDUTY with MIN as a lower limit. In contrast, Equation (5) may be understood to clamp the output duty ratio OUTDUTY with MIN as a lower limit.

Third Modification

While the case where the fan motor to be driven is a single-phase driving motor has been described in the above embodiment, the present disclosure is not limited thereto but may be used to drive other types of motors.

Fourth Modification

Figure 10A:
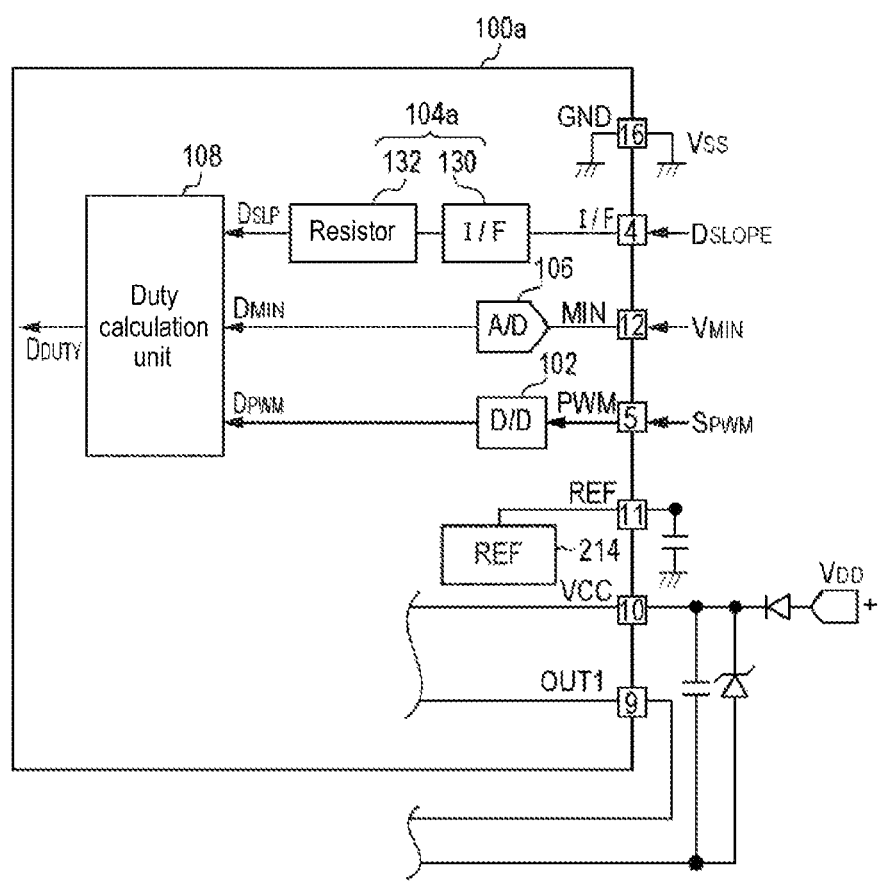
FIGS. 10A and 10B are circuit diagrams of a portion of a driving IC according to a fourth modification.
Figure 10B:
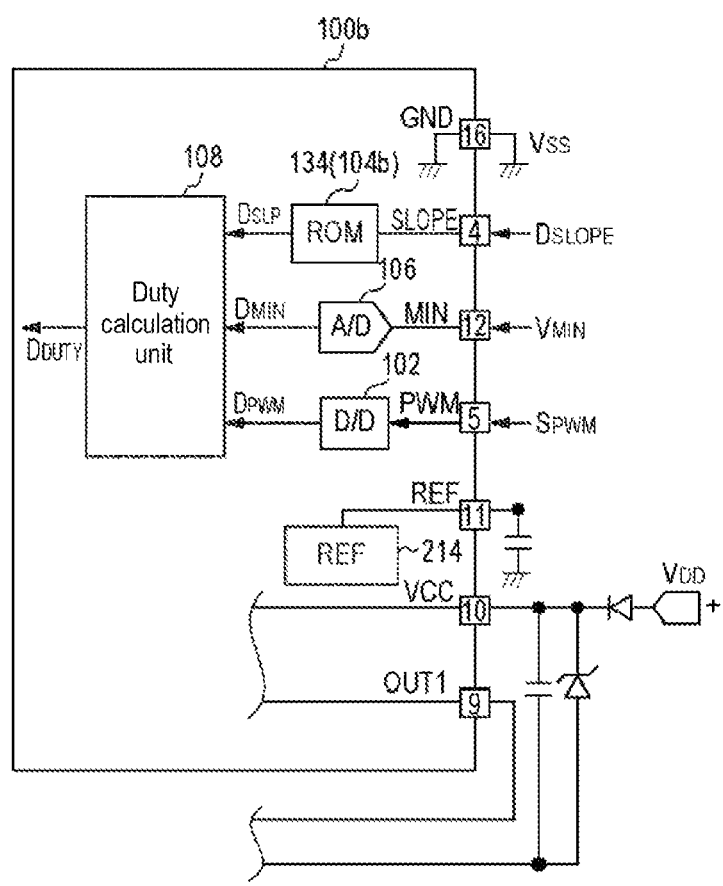

While it has been illustrated in the above embodiment that an analog DC voltage is input to the SLOPE terminal, the present disclosure is not limited thereto. For example, information indicating a slope in a digital format may be input to the SLOPE terminal. FIGS. 10A and 10B are circuit diagrams of a part of a driving IC according to a fourth modification.

A driving IC 100*a* shown in FIG. 10A includes an I²C (Inter IC) interface which is a kind of serial interface. In this case, an interface (I/F) terminal connected to a serial bus is a SLOPE terminal which is input with serial digital data $D_{SLOPE}$ indicating the slope SLP in addition to a variety of data. In the driving IC 100*a*, a slope acquisition unit 104*a* includes an interface circuit 130 and a memory 132. The interface circuit 130 receives the digital data $D_{SLOPE}$ indicating the slope SLP. The memory 132 is a register storing a second digital value $D_{SLP}$ corresponding to the digital data. The serial interface may be replaced with a parallel interface.

A driving IC 100*b* shown in FIG. 10B includes an externally-writable nonvolatile memory. The digital data $D_{SLOPE}$ indicating the slope SLP is input to the SLOPE terminal. In this case, a slope acquisition unit 104*b* may include a nonvolatile memory 134. The nonvolatile memory 134 is a writable ROM (Read Only Memory) which stores a second digital value $D_{SLP}$ input to the SLOPE terminal. The nonvolatile memory 134 may be a software-based writable OTP (One Time Programmable) ROM (Read Only Memory) or an EEPROM (Electrically Erasable Programmable Read Only Memory).

Fifth Modification

Elements constituting the driving IC 100 may be all monolithically integrated, or may be distributed over separate integrated circuits, or may be partially formed with discrete components. Which parts to be integrated may be determined depending on cost, area and usage.

According to the present disclosure in some embodiments, it is possible to appropriately control the validation and invalidation of a lock protection function.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A motor driving circuit for PWM (Pulse Width Modulation)-driving a fan motor, comprising:
    a control input interface circuit configured to generate a first digital value indicating an input duty ratio based on an external control input signal;
    a duty calculation unit configured to generate a duty command value linearly increasing with a slope, which can be set from the outside, with respect to the first digital value;
    a digital pulse width modulator configured to generate a control pulse having an output duty ratio corresponding to the duty command value;
    an output circuit configured to drive a fan motor based on the control pulse;
    a lock protection circuit configured to switch between an enable state and a disable state and to stop a supply of power from the output circuit to the fan motor when a lock of the fan motor is detected in the enable state; and
    a torque-off determination unit configured to determine one of a torque-on state indicating a rotation of the fan motor and a torque-off state indicating a stop of the fan motor based on the output duty ratio and to switch the lock protection circuit to the disable state in the torque-off state,
    wherein the torque-off determination unit (i) switches to the torque-off state if the output duty ratio is less than a first threshold in the torque-on state and (ii) switches to the torque-on state if the output duty ratio is more than a second threshold in the torque-off state.

2. The motor driving circuit of claim 1, wherein the second threshold is larger than the first threshold.

3. The motor driving circuit of claim 1, wherein a hysteresis using the first threshold and the second threshold is set in the output duty ratio in the duty calculation unit.

4. The motor driving circuit of claim 1, wherein the control input interface circuit includes:
    a PWM input terminal which receives an input pulse modulation signal having an input duty ratio, as the control input signal, from the outside; and
    a duty/digital converter which receives the input pulse modulation signal and converts the received input pulse modulation signal into the first digital value corresponding to the input duty ratio.

5. The motor driving circuit of claim 4, wherein the duty/digital converter includes:

a level conversion circuit configured to multiply the input pulse modulation signal, which has been converted into two values of 1 and 0, by a coefficient $2^L$ (L being a natural number); and a digital low pass filter which filters output data of the level conversion circuit and outputs the first digital value.

6. The motor driving circuit of claim 5, wherein the digital low pass filter is a one-dimensional IIR (Infinite Impulse Response) filter and includes an adder, a delay circuit and a coefficient circuit connected in series, wherein the adder adds output data of the delay circuit to the output data of the level conversion circuit and subtracts output data of the coefficient circuit, wherein the delay circuit delays output data of the adder, and wherein the coefficient circuit multiplies the output data of the delay circuit by a coefficient $2^{-n}$ (n being a natural number).

7. The motor driving circuit of claim 6, wherein n is determined such that the output data of the coefficient circuit has a ripple with a width of 1 or less.

8. The motor driving circuit of claim 1, further comprising:

a slope setting terminal which receives information indicating a slope of the output duty ratio to the input duty ratio; and a slope acquisition unit configured to acquire a second digital value corresponding to the information indicating the slope, wherein the duty calculation unit linearly increases the duty command value with the slope corresponding to the second digital value with respect to the first digital value.

9. The motor driving circuit of claim 8, wherein the slope setting terminal receives an analog DC voltage indicating the slope, and wherein the slope acquisition unit includes a first A/D converter which converts the DC voltage at the slope setting terminal into the second digital value.

10. The motor driving circuit of claim 8, wherein the slope setting terminal receives serial or parallel digital data indicating the slope, and wherein the slope acquisition unit includes an interface circuit which receives the digital data, and a memory which stores the second digital value corresponding to the digital data.

11. The motor driving circuit of claim 8, wherein the slope setting terminal receives digital data indicating the slope, and wherein the slope acquisition unit includes a nonvolatile memory which stores the second digital value corresponding to the digital data.

12. The motor driving circuit of claim 1, wherein the control input interface circuit further includes:

a DC input terminal which is input with an analog DC voltage; and a second A/D converter which converts the DC voltage at the DC input terminal into a third digital value, and wherein the duty calculation unit clamps the duty command value with the third digital value as a lower limit.

13. The motor driving circuit of claim 12, wherein the duty calculation unit calculates the duty command value according to the following equation:

OUTDUTY=SLP××max(INDUTY,MIN)+OFS, where the output duty ratio is OUTDUTY, the input duty ratio is INDUTY, the slope is SLP, the lower limit of the duty command value is MIN, a parameter is OFS, and a function to select a maximum value is max( ).

14. The motor driving circuit of claim 12, wherein the duty calculation unit calculates the duty command value according to the following equation:

OUTDUTY=max(SLP×INDUTY+OFS,MIN), where the output duty ratio is OUTDUTY, the input duty ratio is INDUTY, the slope is SLP, the lower limit of the duty command value is MIN, a parameter is OFS, and a function to select a maximum value is max( ).

15. The motor driving circuit of claim 1, further comprising a standby control unit which begins counting a time after the lock protection circuit enters the disable state; stops at least a part of the motor driving circuit after a predetermined period of time lapses; and switches the motor driving circuit to a standby mode.

16. The motor driving circuit of claim 1, wherein the motor driving circuit is integrated on a single semiconductor substrate.

17. A cooling device comprising:
a fan motor; and
a motor driving circuit of claim 1 configured to drive the fan motor.

18. An electronic apparatus comprising:
a processor; and
a cooling device of claim 17 configured to cool the processor.

* * * * *